April 27, 1937.  H. M. SHENITZ  2,078,816

FISHING LURE

Filed Dec. 11, 1935

Herman M. Shenitz
INVENTOR

BY Victor J. Evans & Co.
ATTORNEYS

Patented Apr. 27, 1937

2,078,816

UNITED STATES PATENT OFFICE 2,078,816

FISHING LURE

Herman M. Shenitz, New York, N. Y.

Application December 11, 1935, Serial No. 53,966

6 Claims. (Cl. 43—47)

This invention relates to artificial fishing bait or lure and more particularly to devices of this character by which the fish is attracted by means of light rays emitted by the lure.

The general object of my invention is to provide a fishing lure of the luminous type adapted for effective use under adverse conditions, such as muddy unclear waters, in which conditions the lures heretofore employed were ineffective due to the poor visibility obtaining.

Another object of my invention is to provide an artificial fishing bait which may be readily converted for fishing under various conditions of light or weather or different local physical conditions as well as night fishing, which conversion may be accomplished by a convenient substitution of the light emitting element within the lure.

A further object of my invention is to provide a device of the character indicated which, regardless of adverse conditions, will produce a highly conspicuous scintillating light to attract the fish.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

Figure 1:
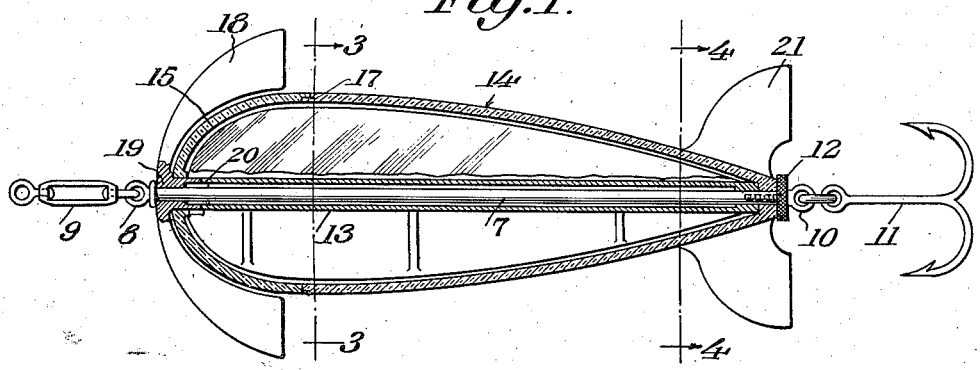
Fig. 1 is a longitudinal sectional view of my fishing lure with parts thereof in elevation.
Figure 3:
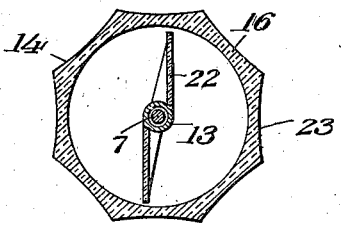
Figure 4:
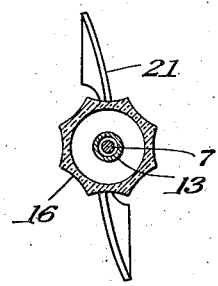

Figs. 3 and 4 are transverse sectional views taken on lines 3—3 and 4—4, respectively, of Fig. 1.

Figure 5:
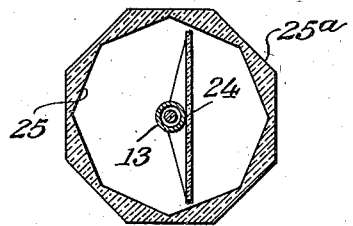
Figure 6:
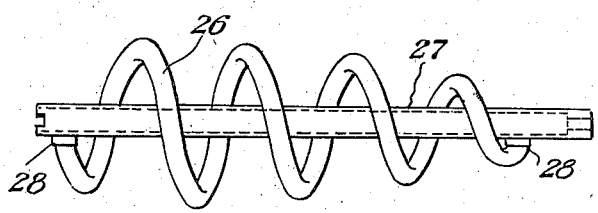

Fig. 5 is a transverse sectional view similar to Fig. 3 but illustrating a modified form of both the casing and the light emitting element of my device; and Fig. 6 is a side elevational view of a second modified form of the light emitting element comprising my fishing lure.

Reference is now had to the accompanying drawing for a more detailed description thereof, in which the numeral 7 indicates a spindle of my fishing lure which in the forward end of the device terminates in an eyelet 8. Secured to the eyelet 8 is a suitable swivel 9 by which my fishing lure is attached to a fishing line. The opposite end of the spindle 7 is provided with an axially tapped hole to receive a screw eye 10 on to which is fastened the usual fish hook 11. A disc 12, the periphery of which is knurled, is threadedly engaged on the screw eye 10 to function as a lock nut for the latter.

On the spindle 7 is rotatably mounted a sleeve 13, the bore of which is formed so as to provide bearings at each end of same, which bearings journal the spindle 7. My fishing lure is provided with a hollow transparent casing 14 which is shaped longitudinally to simulate the contour of a fish and is preferably constructed of two separable members 15 and 16 connected together at the stepped joint 17. The casing 14 is rotatably mounted, the forward end thereof having a bearing on the sleeve 13, the rear end being rotatably supported on a portion of the spindle 7 projecting beyond the sleeve 13.

The sleeve 13 is provided with suitable means for rotating same, which rotation is effected by the travel of the lure thru the water such as is accomplished during trolling. Preferably I employ a rotator comprising a plurality of vanes or blades 18 radially projecting from a common hub 19, which hub is rotatably carried on the spindle 7 and is connected to the forward end of the sleeve 13 as by the coupling 20. The blades 18 are suitably curved or pitched longitudinally, see Fig. 2, so that as same are caused to travel thru the water their rotation will be effected. The casing 14 is provided at the rear end thereof with radially projecting vanes 21 which are also pitched longitudinally similar to the vanes 18 but preferably in the opposite direction so that as the lure travels thru the water the casing 14 will be caused to rotate in counterdirection to the rotation of the sleeve 13. The sleeve 13 is provided with suitable light emitting elements, which in one of the preferred forms embodies a plurality of reflectors 22, see Fig. 3, which reflectors are mounted to project radially from the sleeve 13 so that their reflecting surfaces are tangential to the periphery of the sleeve 13. The longitudinal edges of the reflectors 22 are shaped to conform to the interior of the casing 14.

Figure 2:
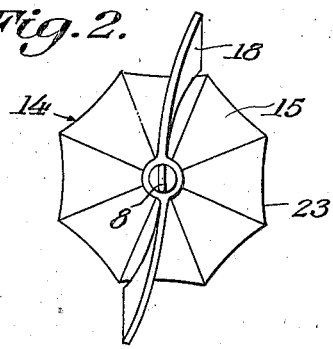
Fig. 2 is an elevational view of the forward end of the device, as shown in Fig. 1.

The outer surface of the casing 14 is so formed as to present a series of prismatic elements so that a scintillating effect will be imparted to the light being reflected or emitting from the reflectors 22. Accordingly, the outer surface is polygonal in cross-section comprising a plurality of preferably equal sides 23. To assure a maximum power of refraction each of the sides 23 are concave substantially as shown in Figs. 2, 3 and 4. It will be apparent by reference to Fig. 3 that during the rotation of the reflectors 22 the novel form of the casing 14 will result in a constantly changing angle of refraction for the light rays thrown from the reflectors 22, thus providing the scintillating effect.

It is to be observed here that while I desire to employ a hollow casing comprising a prismatic structure by which a scintillating light is effected, I do not wish to be confined to such an arrangement, since my artificial fishing bait will also be effective by employing a casing having smooth inner and outer surfaces of transparent material. Where such an arrangement is employed the general polychrome appearance of some fishes may be simulated by providing a transparent casing formed of iridescent or suitably colored glass.

Reference is now directed to Fig. 5 in which is illustrated a modified form of the reflecting rotor and also a modified form of the casing embodying my fishing lure. To effect greater economy in the manufacture of the light emitting element same is provided with a single reflector 24, which is secured to the rotatable sleeve 13 in a suitable manner so as to present a reflecting surface disposed substantially radially from the sleeve 13.

The housing 14 in this modified form comprises an interior surface 25 composed of a series of flat surfaces which in cross-section present a polygonal form, preferably octagonal. The outer surface of the casing 14 in this form is provided with a plurality of substantially flat sides 25a likewise arranged in polygonal formation, preferably composed of eight sides. The interior surface is to be so oriented with relation to the exterior surface that the corners of the interior polygon are adjacent the center of the sides comprising the exterior surface, substantially as illustrated in Fig. 5.

Attention is now directed to Fig. 6 in which is illustrated a third modified form of the light emitting element of my fishing lure, which embodies a tubular structure 26 containing a luminous material such as radium. The tube 26 is preferably wound into a helix to surround the sleeve 27, being secured to the latter by having its free ends engaged in suitable sockets 28 mounted on the sleeve 27.

The modified form shown in Fig. 6 is particularly adapted for night fishing since same is not dependent on an outside source of light. When the use of this form is required same may be installed in the casing 14 by removal of the screw eye 10 and the separation of the parts 15 and 16 of the casing. The sleeve 27 is so formed as to fit into place substantially as shown in Fig. 1. In this manner the modified form of the light emitting element 26 including the sleeve 27 thereof may replace the light emitting element shown in Fig. 1, comprising the reflectors 22, in that the sleeve 27 is formed substantially similar to the sleeve 13.

What is claimed as new is:

1. An artificial fishing lure comprising a rotatable spindle, a hollow transparent casing rotatably mounted on said spindle, said spindle passing thru said casing, a rotator outside said casing adapted to rotate said rotatable spindle, and a reflector within said casing and mounted on the rotatable spindle and adapted to be rotated by said rotator.

2. An artificial fishing lure comprising a rotatable spindle, a hollow transparent casing rotatably mounted on said spindle, said spindle passing thru said casing, a rotator outside said casing adapted to rotate said rotatable spindle, and a reflector within said casing and mounted on the rotatable spindle and adapted to be rotated by said rotator, said casing having a prismatic surface.

3. An artificial fishing lure comprising a rotatable spindle, a hollow transparent casing rotatably mounted on said spindle, said spindle passing thru said casing, a rotator outside said casing adapted to rotate said rotatable spindle, and means for sending light thru said casing and mounted on the rotatable spindle and adapted to be rotated by said rotator.

4. An artificial fishing lure comprising a rotatable spindle, a hollow transparent casing rotatably mounted on said spindle, said spindle passing thru said casing, a rotator outside said casing adapted to rotate said rotatable spindle, and means for sending light thru said casing and mounted on the rotatable spindle and adapted to be rotated by said rotator, said means comprising a helical tube containing a light emitting substance.

5. An artificial fishing lure comprising a rotatable spindle, a hollow transparent casing rotatably mounted on said spindle, said spindle passing thru said casing, a rotator outside said casing adapted to rotate said rotatable spindle, and a reflector within said casing and mounted on the rotatable spindle and adapted to be rotated by said rotator, said casing having inner and outer prismatic surfaces.

6. An artificial fishing lure comprising a rotatable spindle, a hollow transparent casing rotatably mounted on said spindle, said spindle passing thru said casing, a rotator outside said casing adapted to rotate said rotatable spindle, a reflector within said casing and mounted on the rotatable spindle and adapted to be rotated by said rotator, and a second rotator which is mounted on said casing.

HERMAN M. SHENITZ.